United States Patent [19]

Simm

[11] 3,979,759

[45] Sept. 7, 1976

[54] PROCESS AND APPARATUS FOR ELECTROGRAPHIC RECORDING UTILIZING CONTACT LIQUID

[75] Inventor: Walter Simm, Leverkusen, Germany

[73] Assignee: AGFA-Gevaert, A.G., Leverkusen, Germany

[22] Filed: Apr. 29, 1975

[21] Appl. No.: 572,932

[30] Foreign Application Priority Data

May 14, 1974 Germany ........................... 2423245

[52] U.S. Cl. ........................ 346/74 ES; 317/262 A; 346/74 EE; 346/74 J

[51] Int. Cl.[2] ................. G03G 15/044; G01D 15/06

[58] Field of Search .......... 346/74 E, 74 EH, 74 ES, 346/74 EE, 74 J; 118/123, 637; 427/358, 428; 317/262 A; 101/DIG. 13

[56] References Cited

UNITED STATES PATENTS

| | | | |
|---|---|---|---|
| 3,152,918 | 10/1964 | Kraus | 427/358 |
| 3,542,578 | 11/1970 | Lang | 427/211 |
| 3,623,122 | 11/1971 | Fotland | 346/74 E |
| 3,654,095 | 4/1972 | Koontz | 346/74 E |
| 3,776,771 | 12/1973 | Shepard | 427/358 |
| 3,867,674 | 2/1975 | Simm | 317/262 A |

*Primary Examiner*—Bernard Konick
*Assistant Examiner*—Jay P. Lucas
*Attorney, Agent, or Firm*—Connolly and Hutz

[57] ABSTRACT

In a process for the electrographic recording of images on an insulating recording substrate by means of a corona discharge the imagewise charging is carried out by means of a recording electrode which is in contact with the recording substrate the electrical contact between the recording electrode and insulating recording substrate being established by means of a conductive contact liquid.

11 Claims, 4 Drawing Figures

PROCESS AND APPARATUS FOR ELECTROGRAPHIC RECORDING UTILIZING CONTACT LIQUID

This invention relates to a process for the recording of electrostatic images, in particular half tone images, on a single layered, insulating film material.

The known electrographic processes, in which a plurality of pin electrodes records electrostatic charge patterns on electrographic paper which usually consists of two layers, an insulating layer and an electrically conductive support paper, are generally not suitable for the recording of half tone images because the transfer of charge from the recording electrodes to the paper starts at only relatively high voltages, e.g. above 600 V, and in a very irregular fashion so that continuous control of the application of charge to the paper is not possible. Furthermore, the surface irregularities produced by the paper felt of the substrate prevent sufficiently uniform distribution of the charge density, which is necessary for development of homogeneous intermediate tones in the image. Moreover, the production of high quantity half tone images which cannot be resolved into lines or points by the naked eye requires relatively high packing densities of the recording electrodes, e.g. 10 pins per mm, but such high packing densities cannot provide the necessary resolution under normal conditions when the necessary high recording voltages of about 600 V to 1200 V are employed, because transfers of charge between adjacent electrodes are unavoidable under these conditions.

An improvement in the production of half tone images is provided by the electrographic process described in U.S. Pat. application Ser. No. 291,045, filed Sept. 21, 1972, now abandoned in which the charge pattern is recorded in a nitrogen atmosphere. In this process, a corona discharge is produced on a needle electrode inside a recording tube which operates at atmospheric pressure. Part of the discharge current is passed through the slit in a diaphragm and used to charge the image support. Control electrodes are placed at the lips of the slit to throttle the passage of current through the slit to varying extents when a control voltage is applied so that continuous variation from weak to strong charging currents is achieved. These processes take place in a stream of nitrogen which enters the discharge chamber through an opening near the corona electrode and leaves through the slit of the diaphragm.

Control voltages of about 100 V are sufficient for complete modulation of this system. Accidental transfer of charges between the electrodes can easily be avoided at such voltages.

The recording of half tone images, however, and especially those covering large image areas at low colour densities, requires not only special recording apparatus but also a special substrate with sufficiently good dielectric properties, uniform thickness and an even surface.

In the electrographic recording process described in U.S. Pat. No. 3,867,674, ordinary commercial single layered film material such as polyterephthalic acid ester foils (Hostaphan foil) or polycarbonate foils or other foils which are highly insulating can now be used as substrates for electrographic images. This is achieved by contacting the recording material for a finite period of time with the charging electrode by means of suitable contact liquids. This method makes it possible to use recording substrates which have virtually ideal properties for the recording of half-tone images, such as excellent homogeneity of support material, high insulating resistance, high dielectric strength and transparancey.

One disadvantage of the known electrographic recording processes is that, even if the recording system according to U.S. patent application Ser. No. 291,045, filed Sept. 21, 1972 is carried out with high precision and if perfect recording substrates are used with liquid contacts in accordance with U.S. Pat. No. 3,867,674, a striated structure in image areas of low density cannot be completely prevented. Thus it is found that under the conditions described in U.S. Pat. No. 3,867,674 particularly when applying a positive potential of 2000 V between the slit diaphragm and the film substrate (British Patent No. 1,385,595, and/or U.S. patent application Ser. No. 549,669), a non-self-sustaining gas discharge is ignited in this chamber, which is recognizable by a faint luminescence of the gas in this zone and unexpectedly high intensity of the recording current. This gas discharge is stimulated and maintained by that part of the discharge current from the point corona which passes through the slit of the diaphragm. When the passage is completely open, a relatively strong and uniform luminescence is obtained. If the energizing current is more powerfully throttled by application of a higher control voltage to the control electrodes, the uniformity of the luminescence is destroyed, the discharge becomes unstable and zones of stronger and weaker luminescence are left before luminescence disappears completely at the point when the energizing current is completely blocked. During this transitional stage, the charging current densities are also very variable and, as can be expected, they produce unevenly distributed stripes on a recording substrate which is being charged in its passage through this zone.

The formation of striations is thus caused by the non-self maintained gas discharge. However, with the apparatus and operating conditions given in U.S. Pat. No. 3,867,674, the required charging current density for the process cannot be obtained without the reinforcing effect of the gas discharge.

It is therefore an object of this invention to modify the process described above or provide a new process in which the unwanted striations of the image can be reduced or substantially eliminated and the non-self-maintained gas discharge described above, which is the principal cause for the formation of striations, can be reduced or substantially prevented.

This invention therefore provides a process for the electrographic recording of images, in particular half-tone images, on an insulating recording substrate, by means of a corona discharge producing a discharge current of which part is removed through the slit of a diaphragm and used for charging the recording substrate, in which process the imagewise charging is carried out by means of a recording electrode which is in contact with the recording substrate on that side of the substrate which is remote from the slit of the diaphragm, the electrical contact between the recording electrode and insulating recording substrate being established by means of a conductive contact liquid which is supplied to the point of contact.

One of the effects of the electrode arrangement according to the invention is that in the apparatus described in U.S. Pat. No. 3,867,674, the opening provided in the slit diaphragm for the discharge current of the point corona can now be made so permeable that the current density of the portion of current which passes through the slit to the recording substrate reaches sufficiently high values for the recording of suitable images even without the aid of a reinforcing gas discharge.

In detail, the process according to the invention consists in that part of the discharge current of a corona discharge is passed through a slit diaphragm and used for charging an insulating film strip used as recording substrate the imagewise charging of the film being carried out by means of a recording electrode which is in contact with the recording substrate on that side of the film which is remote from the slit of the diaphragm, electric contact between the recording electrode and the film being established by supplying a conductive contact liquid to the area where the electrode is brought into contact with the substrate.

The recording electrode is advantageously composed of a plurality of recording elements which are insulated from each other and densely packed in a row to form a narrow edge of contact for the recording substrate.

When no voltage is applied to these recording elements or if they are under a uniform voltage, the recording electrode functions electrically like a conductive block since the insulation between the individual recording elements is broken down by the contact liquid. On that side of the recording substrate which faces the slit of the diaphragm, the partial current from the corona discharge applies a uniform charge in which the recording elements do not show up separately. The voltage at the electrode, however, must be kept so low that no gas discharge takes place in the space between the slit and the recording substrate.

The application of differing voltages to the recording elements results in a slight current consumption and the production of potential jumps or gradients which are also reproduced on the dry opposite side of the recording substrate so that this side of the substrate becomes differentially charged by the discharge current of the corona discharge.

The contact liquid must therefore fulfil two conditions with regard to its electrical conductivity:

1. The conductivity must be great enough to bridge over the insulating gaps between the recording elements at the point of contact with the recording substrate so that unbroken electric contact is obtained.

2. On the other hand the conductivity should be low as possible so that the flow of current which takes place between adjacent recording elements when differing recording voltages are applied will not be powerful enough to cause electrolytic decomposition and heating which would result in destruction of the recording electrode.

Contact liquids which amply fulfil both conditions could surprisingly be found. According to the invention, contact liquids with electrical conductivities within a range of $10^{-4}$ to $10^{-9}$ $\omega^{-1}$ $cm^{-1}$, preferably between $10^{-6}$ and $10^{-7}$ $\omega^{-1}$ $cm^{-1}$, are suitable.

In the process according to the invention, therefore, the formation of line structures by the recording elements themselves is prevented by wetting the recording elements of the recording electrode with contact liquid except when differing control voltages are deliberately applied to produce differing charge densities on the recording substrate.

Furthermore, by arranging the recording electrode underneath the recording substrate the process according to the invention makes it possible for the slit in the diaphragm to be made wide enough and with sufficiently thin, sharp edges to reinforce the passage of the corona partial current through the gap to such an extent that the charging current density will be sufficiently high for recording images at high speeds even if the anode potentials applied are so low, for example 500 V or 300 V, that no significant gas discharge will occur at the recording point. A control voltage of 300 V, which is sufficiently low to ensure that the insulation between the elements of the recording electrode will not break down, is then a sufficiently high anode potential for the charging current so that no additional anode voltage is necessary.

Since in the absence of gas discharge at the recording point, the charging current consists entirely of charge carriers of the same sign and since charges of equal sign repel each other, the charging current is automatically stabilized and the charge carrier density rendered homogeneous so that the cause for striations in the recording which could be contributed by current distribution is also eliminated. If, on the other hand, gas discharge occurs at the recording point, charge carriers of both signs are produced by the action of a too powerful electric field, and these charge carriers, as a result of reinforcing effects and recombination processes, produce a labile state of discharge and formation of channels in the discharge zone and hence result in striations in the image.

In comparison with the known processes according to U.S. Pat. No. 3,867,674 and U.S. patent application Ser. No. 291,045, filed Sept. 21, 1972 in which control electrodes are arranged in the slit of the diaphragm to restrict the slit, thereby achieving a very high degree of sensitivity but at the expense of reduced passage of current and increased tendency to the formation of striations, the process according to the invention, although being less sensitive in control, has a lower tendency to the formation of striations, which can even be completely suppressed if the electrodes are designed with precision. To this is added the advantage that, in the electrode arrangement according to the invention, the recording electrode, recording substrate and source of charging current are connected in series in a circuit in which as the control voltage becomes lower, charging of the image substrate and hence blackening in the developed image tend towards zero so that, in the region where this takes place, any recording faults must also disappear. According to this principal, any faulty recordings due to insufficient precision in the construction of the electrodes are most likely to occur in areas of highest charges and high electrode voltages, but in these areas they are least noticeable in the developed image since minor variations in density are hardly detectable in image areas of high colour density.

The process will now be explained with reference to FIGS. 1 to 4 of the drawings.

Figure 4:
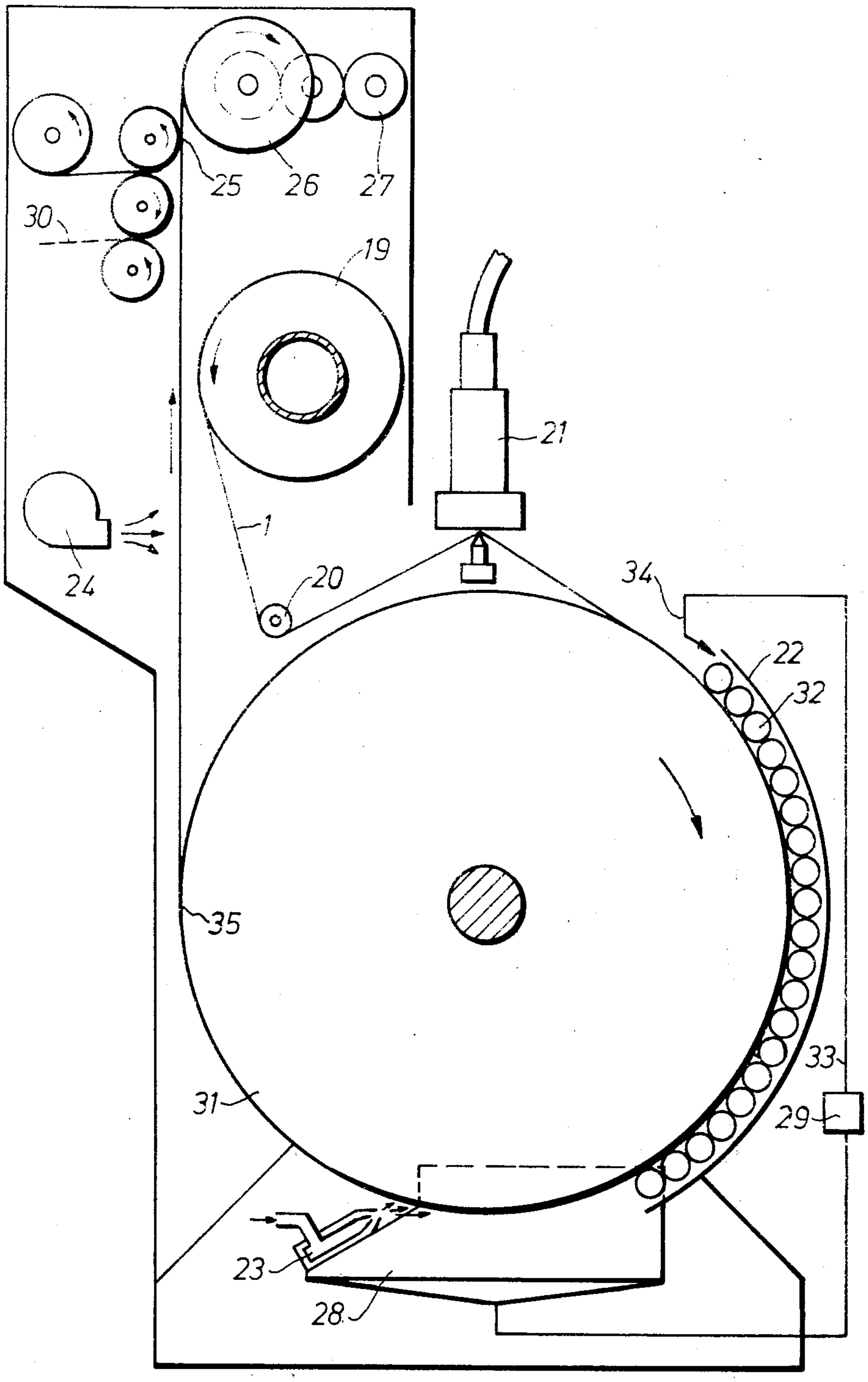

FIG. 4 gives an overall view of all the partial functions of a recording device for producing half tone images up to the stage of fixing the finished image.

Figure 1:
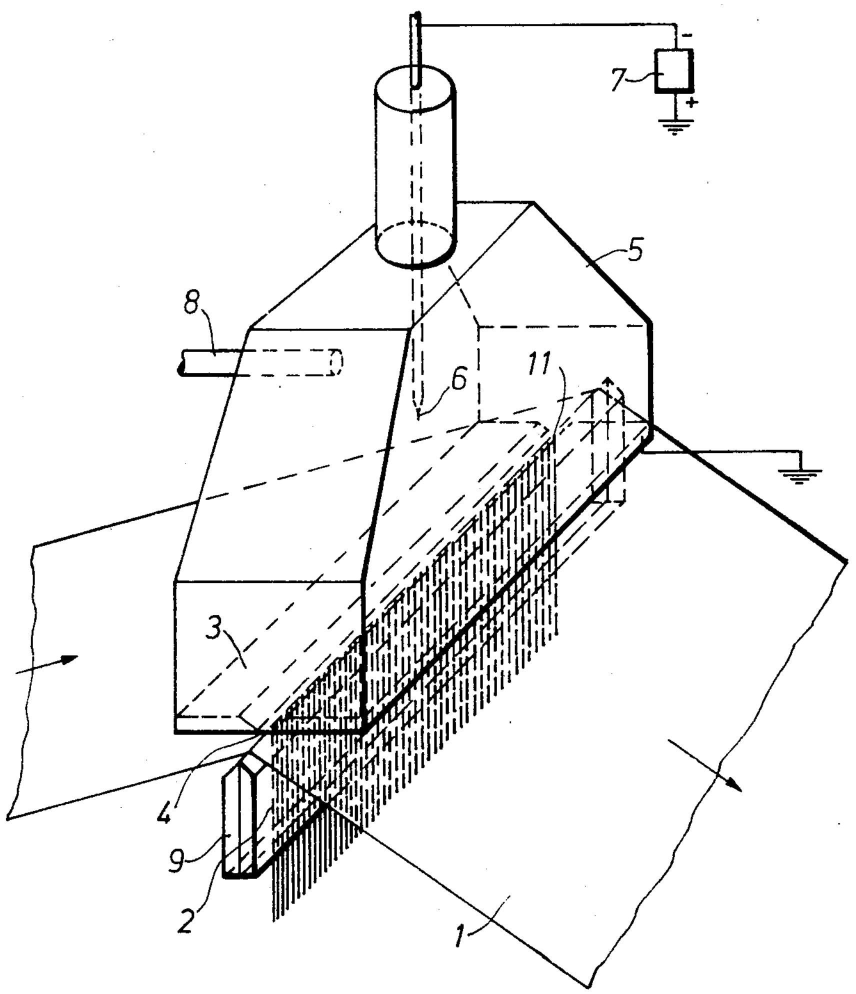
FIG. 1 shows the basic arrangement of the corona electrode, silt diaphragm, recording substrate and recording electrode.

As shown in FIG. 1, the recording substrate 1, for example a polyterephthalic acid ester film 10 to 20$\mu$ in thickness or a polycarbonate film of the same thickness is stretched over the edge 11 of the recording electrode 2. The slit diaphragm 3 with slit 4 is situated close above the edge 11, e.g. at a distance of 0.1 to 0.5 mm. This diaphragm is made of electrically conductive material and covers the bottom of the housing 5 which is made of insulating material. The needle electrode 6 is inserted in this housing and connected to a direct voltage source 7.

In the operative state, the recording substrate 1 is displaced at uniform velocity in the direction of the arrow and nitrogen is blown into the housing 5 through the aperture 8 in the quantity required to displace the air by expelling it through the gap 4 and prevent the air from diffusing back through this gap. In this way, both the discharge chamber containing the needle electrode and the recording zone between the gap 4 and the top edge of the recording electrode 2, which is covered by the recording substrate, are under nitrogen. As is well known, the discharge current of a corona discharge is many times more powerful in an atmosphere of nitrogen or noble gas than in air under otherwise similar conditions.

A corona discharge 13 (FIG. 3) is produced on the needle electrode 6 by a direct voltage, for example of −20 or −30 kV. The discharge current flows mainly between the needle electrode 6 acting as cathode and the slit diaphragm 3 as anode. By applying a positive voltage to the recording electrode 2, part of the corona discharge can be removed through the slit 4 of the diagram and used for charging the film.

Figure 2:
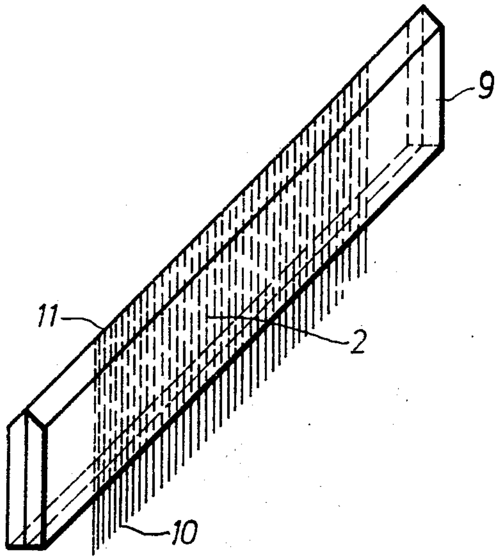
FIG. 2 illustrates an embodiment of the recording electrode.

The recording electrode 2 shown in FIG. 2 comprises an insulating holder 9 for the recording element 10 which consist of wires densely packed in a row, for example 10 wires per mm, and insulated from each other. The holder itself is preferably made of glass. To avoid corrosion by contact with the contact liquid and by electrolytic decomposition, the recording elements are preferably made of noble metals such as platinum or gold or of refined steel or at least coated with protective layers of noble metal.

Figure 3:
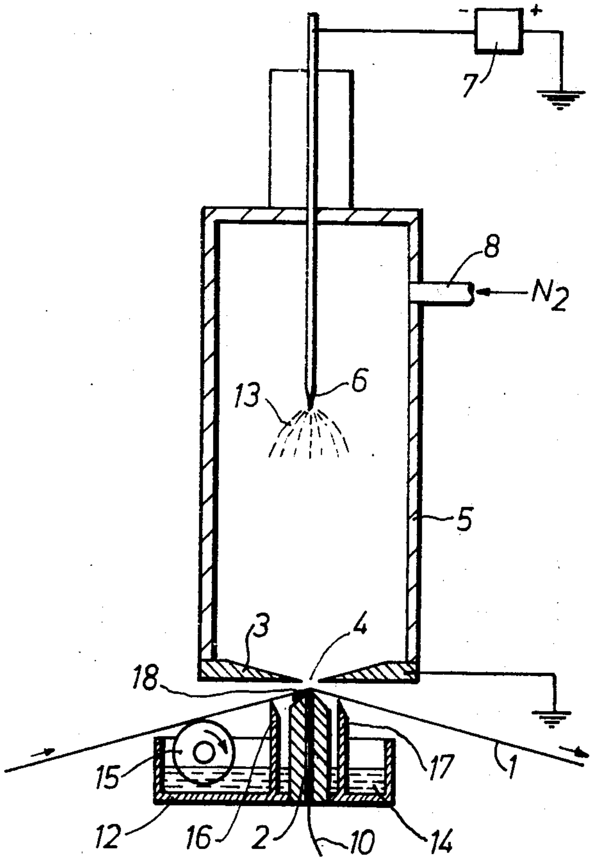
FIG. 3 illustrates the recording system including the device for applying the contact liquids.

FIG. 3 illustrates the mode of operation of an applicator device for the contact liquid in the recording system. The recording electrode 2 is placed in the bottom of a vat 12 in such a manner that the recording elements 10 pass through the bottom of the vat insulated from each other. The vat contains contact liquid 14 which is applied to the undersurface of the recording substrate 1 by a rotating applicator roller 15. A stripper 16 strips off excess liquid and returns it to the vat 12 to leave a limited quantity of uniformly distributed liquid on the undersurface of the recording substrate, which quantity is sufficient to fill completely the gaps between the top edge of the recording electrode and the recording substrate. The stripper 17 moves a further portion of the skin of liquid and leaves just sufficient liquid on the undersurface of the substrate to form a conductive layer for the subsequent electrical treatment of the substrate. If the quantity of liquid left on the substrate is correctly controlled by the roughness of the edges of the stripper, a liquid beading 18 is formed by the damming up of liquid at the point of contact of the recording electrode with the recording support 1 when the recording substrate is in motion. This beading ensures the contact necessary to prevent faults in the form of striations in the recorded image.

The contact liquids used may be pure liquid or liquid mixtures with conductivities in the range of $10^{-4}$ to $10^{-9}$ $\omega^{-1}$ $cm^{-1}$, preferably $10^{-6}$ to $10^{-7}$ $\omega^{-1}$ $cm^{-1}$. For practical reasons, the liquids should, of course, be odourless and flame resistant and should by nature have conductivities within the range mentioned above. Certain conductivity values can be obtained by mixing different liquids of differing conductivities or by adding soluble ionising substances. Suitable contact liquids include, for example, benzyl alcohol, diethylene glycol monoethylether and ethyl glycol. Suitable mixtures can be prepared, for example, from benzyl alcohol and linseed or by mixing isopropanol, n-butanol, hexanol or cyclohexanone with low viscosity methyl polysiloxane (e.g. Baysilon oil M 10, a trade product of BAYER AG). Additives such as dimethyltetradecylbenzylammonium bromide may be added to render the liquid conductive. Further examples of substances suitable for increasing the conductivity of the contact liquid include compounds taken from the group of so-called conductivity antistatic agents of the kind used for antielectrostatic treatment of textiles, e.g. polyglycols, fatty acid polyglycol esters, ethoxylated amines, amine oxides, ammonium salts and phoshporic acid esters.

The conductivity of the contact liquid can be reduced not only by means of the oils already mentioned above but also, for example, by means of other, preferably drying oils such as soya oil, safflower oil, poppy seed oil and walnut oil. Such oils may in addition improve the levelling properties of the contact liquid, thereby assisting the wetting at the points of contact.

For charging the dry side of the recording substrate to sufficiently high charge densities it is necessary to maintain a certain relationship between the mechanical and electrical operative factors. If, for example, the strip of recording substrate is displaced at a rate of 40 cm/s and the strip is charged to potentials of up to about 250 V, it is necessary to use discharge current intensities of about 1 mA at the needle electrode if the distance between the tip 6 and diaphragm slit 3 is 80 mm and discharge takes place in pure nitrogen. Suitable widths for the diaphragm slit are then in the range of 0.2 to 0.6 mm and suitable distances between diaphragm and recording surface 0.1 to 0.5 mm. The control voltage of the recording elements 10 may vary within the range of 0 to 300 V.

The recording process according to the invention will now be described in detail with reference to FIG. 4 which shows a complete apparatus for the production of half tone and line images.

A clear, transparent polyester film 1 with a thickness of 15 $\mu$ is drawn off a roll 19 at the rate of 40 cm/s and passed over the deflecting roller 20 and then through apparatus for image recording 21, development 22, preliminary drying 23, final drying 24 and fixing 25.

The mode of operation and operational data of the apparatus for image recording 21 have already been described above. The recording elements 10 are connected to an instrument for scanning an original which is to be copied. This instrument converts the differing colour densities of the original into electric signals in known manner.

Instruments known for this purpose include the so-called Flying Spot Scanner-System (used, for example, in apparatus manufactured by LITTON INDUSTRIES ELECTRON TUBE DIVISION, San Carlos, California 94070) or scanning systems which operate with photoelectric diodes and amplifiers connected in series. Examples of the latter include the Solid State Line Scanner Systems RL-512 and RL 1024 B manufactured by RETICON CORPORATION 365 Middlefield Road, Mountain View, California 94040.

In the development part 22 of the apparatus, the charge image produced on the recording substrate is rendered visible by electrophoretic deposition of toner particles from an insulating liquid by means of a liquid developer of known kind. A detailed description of processes for the development of charge images recorded by the process according to the invention and developer materials suitable for this purpose may be found in "Xerography and related process", by J. H. Dessauer and M. E. Clark, Focal Press, London, New York, 1965, in particular in Chapter XII, Section 12.7. A suitable developer liquid can be prepared, for example, by diluting the following concentrate by 15:1000 parts by volume with Isopar H (Trade name for an isoparaffin hydrocarbon mixture boiling in the range of 177°–188°C marketed by Esso Belgium N.V., Antwerp):

| | |
|---|---|
| Carbon black (average particle size 20 nm) | 30 g |
| Zinc monotridecylphosphate as dispersing agent | 1.5 g |
| Isopar H (Trade Name) | 750 ml |
| Resin solution described below | 150 g. |

The resin solution is prepared by heating 500 g of Alkydal L 67 [Trade name of Bayer AG, Leverkusen, for an alkyd resin modified with linseed oil (67%)] and 50 ml of light petrol containing 11% of aromatic constituents to 60°C until a clear solution is obtained and then cooling the solution.

Details concerning this wet development process can be found in the article by Metcalf entitled "Liquid Developers for Xerography" in J.Sci. Indstr. 32 (1955), 74 to 75 and in British Patent Specification No. 835,044 and U.S. Pat. No. 2,890,174.

The developer liquid is applied to the surface of the recording substrate, for example by means of applicator rollers 32, and distributed in such a way that the whole image area comes into contact with the developer liquid but the liquid is not spread over the edge of the recording substrate. To achieve this, the developer liquid is passed through the pipe 33 to the point 34 of the developer apparatus and after passing through a plurality of applicator rollers 32 it is collected in the container 28. From there, it is returned to the inlet 34 by a pump 29. Good electrical contact between the recording substrate and a conductive base is essential for the development process. For this purpose, the recording substrate, which is wetted with contact liquid on its under surface, is stretched over the surface of a metal drum 31 which moves in the same direction as the film strip.

As the recording substrate leaves the developer bath, its upper surface (image side) is sufficiently dried by a sharp blast of air from the flat nozzle 23 to make it possible for the substrate to be lifted from the surface of the drum at 35 without the image being thereby smudged or distorted. The remainder of the developer liquid is then removed by a stream of hot air from the blower 24.

The toner image, which is still liable to be smudged at this stage, is now fixed simply by pressing a white, self adhesive paper to the image side of the recording substrate at part 25 of the apparatus. The finished image is then viewed through the clear, transparent recording substrate. A protective layer is thus obtained which is completely smudgeproof. The white, self adhesive paper is supplied in the usual commercial form of a so-called labelling paper with a readily detachable covering sheet on the adhesive side. The papers preferably have a surface weight of 80 g/m$^2$ to 100 g/m$^2$. Suitable self adhesive paper of this kind is marketed e.g. by Beiersdorf AG of Hamburg under the Trade name "Tesa" or by Papierund Klebstoffwerken Linnich GmbH, Dusseldorf.

The rollers are suitably arranged so that the cover sheet 30 is automatically detached before application of the adhesive layer to the recording substrate and discarded from the apparatus.

The image strip consisting of recording substrate and the paper substrate glued to it can be rolled up on the cylinder 26 which is driven by a transmission mechanism 27 or it may be removed from the apparatus by some other suitable mechanical device and cut up into individual pictures.

If the various functions of the apparatus are correctly adjusted to each other, half tone or simple line images free from striations can be produced, for example at a rate of three successive images with a format of 9 × 10 cm per second.

I claim:

1. An electrographic process for the production of charge images on a moving insulating recording strip material, said recording strip material being capable of being charged by a discharge current produced by a voltage between a corona discharge electrode and a recording electrode, imagewise charging of recording strip material by the action of the corona discharge current while moving across the record electrode, comprising the steps of producing a corona discharge from a discharge electrode, directing part of the corona discharge to a surface of the strip and subjecting the strip to the action of the discharge current while moving across the recording electrode, passing said part of the discharge current to said surface through an elongated gap defined by a diaphragm, producing an electric field between the recording electrode and the diaphragm and intensifying the contact of the more remote surface of the recording material and the recording electrode by applying a conducting liquid having a conductivity in the range of $10^{-4}$ to $10^{-9}$ $\omega^{-1}$ cm$^{-1}$.

2. The process of claim 1 wherein the recording electrode consists of a plurality of recordng elements which are insulated from each other and arranged densely packed in a row to form a narrow edge as a base for the recording strip material.

3. The process of claim 1 wherein the control voltage at the recording elements is no more than 500 volts.

4. The process of claim 1 wherein a gas stream consisting of nitrogen gas is introduced into the space between the corona discharge electrode and the recording electrode.

5. The process of claim 1 wherein the recording electrode contains elements consisting of a noble metal.

6. The process of claim 1 wherein the recording electrode contains recording elements coated with protective layers of a noble metal.

7. The process of claim 1 wherein the recording electrode is made up of steel recording elements.

8. The process of claim 1 including the step of applying the conducting liquid to the more remote surface by means of an applicator.

9. The process of claim 8 wherein the applicators limit the quantity of liquid on the recording strip material.

10. An apparatus for electrographic recording of images on a neutral recording material comprising a discharge electrode for generating a substantially continuous supply of charge carriers, a diaphragm toward which said charge carriers are directed, a gap defined by said diaphragm through which said charge carriers are passing, a movable strip material having a surface movably adjacent to said gap for progressively receiving said charge carriers distributed laterally across the surface; a control electrode disposed at the side of the recording material more remote from the gap and extending laterally of the strip to control the intensity of the charge carriers and contact means for contacting said control electrode to said more remote side of the recording material, said contacting means including a conductive contact liquid having a conductivity in the range of $10^{-4}$ to $10^{-9}$ $\omega^{-1}$ $cm^{-1}$ for rendering the charge carrier density homogeneous.

11. In an apparatus as claimed in claim 10 means on the more remote side for forming the liquid into a liquid bead at the line of contact to provide a homogeneous distribution of electrical contact across said recording material.

* * * * *